June 14, 1927.
B. W. JONES
1,632,603
MOTOR CONTROL
Filed Dec. 3, 1926
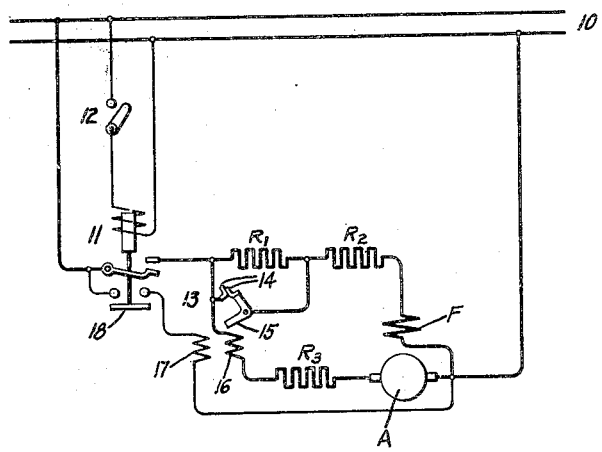
Inventor:
Benjamin W. Jones,
by
His Attorney.

Patented June 14, 1927.

1,632,603

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

MOTOR CONTROL.

Application filed December 3, 1926. Serial No. 152,490.

My invention relates to improvements in systems of control for electric motors whereby the motor speed is automatically regulated to meet predetermined conditions. Although the invention is not necessarily limited thereto, it has a particular application to motor drives wherein the load driven by the motor is apt to overhaul the motor and the load is apt to obtain a dangerous undesirably high speed. Such conditions are encountered in motor driven hoists, and in particular hoist drives provided with a series wound motor, the series field of which, during lowering operations, is connected in a different circuit from the circuit in which the armature is included, as for example, the field is connected in shunt relation with the armature during lowering operations. For such drives it is desirable to regulate the lowering speed of the motor and at the same time permit as high a speed of lowering as is practical when conditions are such that a high lowering speed is permissible. The principal object of my invention is the provision of an improved control for the motor whereby this result is secured.

In carrying my invention into effect in the form which I now regard as the preferred form thereof, I provide a control system for the electric motor so arranged as to automatically govern a resistor in the field circuit of the motor when the motor field winding is connected to produce shunt characteristics for the motor, the resistor being controlled by an electromagnetic switch which automatically takes into account the value and direction of the current in the motor armature circuit.

In the preferred form of my invention, I provide a series electromagnetic switch or contactor for controlling the resistor in the shunt field circuit, and this contactor is preferably of the type disclosed and broadly and specifically claimed in the Patent No. 1,445,994, dated February 20, 1923, to Eugene R. Carichoff and myself. In the system of the present invention the contacts of this switch are biased so as to be normally in their closed position and normally shunt the resistor in the field circuit of the motor while conditions are such that a high field excitation is desirable. In case the current in the motor armature circuit is in a certain direction, as for example, motor lowering direction, with the motor exerting a driving torque, and the value of the motor armature current reduces to a predetermined value, the switch will automatically open so as to effect the reinsertion of the resistor in the field winding circuit and permit a higher speed of operation. In case the current in the motor armature circuit is above a predetermined value, such as during the accelerating period lowering direction of motor operation, (driving torque being exerted by the motor), the switch will magnetically hold its contacts closed so as to insure a relatively high field excitation for the motor. After the motor is up to stable speed corresponding to strong motor field excitation, if the load should overhaul the motor and the direction of the motor armature current be reversed, the switch will automatically reclose its contacts and hold the same closed magnetically at all values of the motor armature current in this direction. The motor is thus automatically protected against a high operating speed during the lowering of the load, and in case the load is relatively light, a comparatively high lowering speed is automatically effected.

In the accompanying drawing I have indicated in a very simple diagram a motor control system which incorporates the invention. It will be understood by those skilled in the art that this diagram is intended to merely illustrate the connections of the motor and its control for the operation of the motor in such a direction in which the automatic protection afforded by the invention is required. In other words, I contemplate that my invention will be used in a reversing control system in which the motor is operated in one direction to produce a torque tending to operate a load in a corresponding direction and to operate in the opposite direction to set up a torque for either operating or regulating the movement of the load in an opposite direction. I have not shown such reversing control since it is of itself old and well known and particularly since the essence of my invention resides in the simple control indicated in the accompanying drawing.

Referring to the diagram the electric motor is provided with an armature A and a series type field winding F, which is shown connected in a different circuit than the motor armature, in that the winding is connected in shunt relation with the motor armature. The motor is connected to the source of supply 10 through the operation of the line contactor 11, which is governed by the master switch 12. As before stated, the diagram indicates the control of the motor for only one direction of operation, and I would have it understood that the invention is applicable to reversing systems of control, but such system has not been shown since it would add nothing to an understanding of the invention.

It will also be understood that during operation of the motor in one direction, as for example, the hoisting direction, the field winding F will be included in series relation with the motor armature instead of in shunt relation therewith, as shown in the drawing. The energization of the field winding F is governed by means of the resistors $R_1$ and $R_2$, and the current in the motor armature circuit is regulated by means of the resistor $R_3$. The resistor $R_1$ in the field winding circuit is governed by the series contactor 13, which is of the construction and arrangement disclosed in the said Carichoff and Jones Patent No. 1,445,994, dated February 20, 1923. This contactor is provided with a set of main contacts 14, one of which is operated by means of the movable magnetic member 15, the contacts being normally biased to their closed position, as indicated in the drawing. This contactor is also provided with a series winding 16 and a shunt winding 17, corresponding to the respective series and shunt windings of the contactor of said patent, and these windings are disposed on a magnetic circuit as specified in the patent. The energization of the shunt winding 17 is controlled by the auxiliary switch 18 associated with the line contactor 11.

It is assumed that the motor is connected to drive a load, which under some conditions, may be of such a nature as to overhaul the motor. With such assumption the operation of my invention is as follows: In order to connect the motor to the source of supply 10, the master switch 12 is first closed, thereby energizing the line contactor 11 to close its main and auxiliary contacts. The closing of the main contacts of this switch will energize the motor from the source of supply and the resistor $R_1$ will be maintained shunted by means of the contactor 13. The shunt winding 17 of the contactor 13 will be energized through the auxiliary switch 18 of the line contactor 11.

While the current taken by the motor is in excess of a certain value, as happens during the acceleration interval, the contacts 14 of the series contactor 13 will be magnetically held closed so that a relatively high energization for the field winding F is secured. In case the load being lowered is comparatively light (as is the case in a hoist when an empty hook is being lowered), and the current in the motor armature circuit reduces to less than a predetermined value after the acceleration interval is past, the winding 16 of contactor 13 will effect operation of the movable magnetic member 15 to open the switch contacts 14 and thereby insert the resistor $R_1$ in the circuit of the field winding F. This will reduce the energization of the field winding and effect an increased speed of operation of the motor and the associated load. If while the resistor $R_1$ is inserted in the circuit of the field winding F, the speed of the load should increase to such a value that the motor is overhauled by the load, the current in the motor armature circuit will reverse and this will reverse the direction of current through the series winding 16 of the contactor 13. The contactor 13 has the peculiar characteristic, as is set forth clearly in the aforementioned patent, that the movable magnetic member 15 will be operated to and magnetically held in a biased position for all values of reversed current through the winding 16. This is brought about by the cooperation with the shunt winding 17, as explained in the said patent.

This contactor, therefore, operates to automatically include the resistor $R_1$ in the field winding circuit of the motor in case the load being operated by the motor is less than a predetermined value and the armature current of the motor is less than a predetermined value and such armature current is in a predetermined direction. If, however, the current in the motor armature circuit reverses as is the case when the load overhauls the motor and the motor becomes a generator, the resistor $R_1$ will be magnetically shunted by the contactor 13 and the shunting will be maintained for all values of such reversed current. The lowering speed is thus automatically limited and at the same time a high lowering speed is permitted in case conditions are proper for such high speed of operation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. In combination, a motor having its armature included in one circuit and a field winding included in another circuit, a resistor for governing the energization of said winding to govern the motor speed, a switch biased to the closed position for shunting said resistor, and an electroresponsive device energized responsively to the motor armature current and provided with means for automatically effecting the opening of said switch and the insertion of said resistor in the circuit of said field winding when the motor armature current is in a predetermined direction and is less than a predetermined value, the said device being provided with windings for magnetically holding said switch in its biased position for all values of motor armature current above said predetermined value and for all values of motor armature current when said current is in the direction opposite to said predetermined direction.

2. In combination, a motor having its armature included in one circuit and a field winding included in another circuit, a resistor in the circuit of said field winding, and a series contactor biased to normally shunt the said resistor, the said contactor having a series winding included in the motor armature circuit and a magnetic structure energized thereby for magnetically holding the said switch in its biased position for all values of the motor armature current above a predetermined value and in a predetermined direction and for magnetically opening the said switch to open the shunt about said resistor when the motor armature current is less than the said predetermined value and in the said predetermined direction, the said contactor being provided with a shunt winding which insures the opening of the contactor to include said resistor in the circuit of said field winding at all values of the motor armature current less than said predetermined value and in said predetermined direction, and for insuring that said contactor will magnetically maintain the shunt about said resistor for all values of the motor armature current when said current is in a direction opposite to the said predetermined direction.

In witness whereof, I have hereunto set my hand this 2nd day of December, 1926.

BENJAMIN W. JONES.